United States Patent [19]
Kurogane et al.

[11] Patent Number: 5,493,408
[45] Date of Patent: Feb. 20, 1996

[54] IMAGE PROCESSING SYSTEM HAVING FACILITATED COMMUNICATION BETWEEN AN IMAGE DATA TRANSMITTER AND AN IMAGE PROCESSOR

[75] Inventors: Toshio Kurogane; Yuji Hikawa, both of Kanagawa, Japan

[73] Assignee: Fuji Xerox Co., Ltd., Tokyo, Japan

[21] Appl. No.: 22,629

[22] Filed: Feb. 25, 1993

[30] Foreign Application Priority Data

Feb. 28, 1992 [JP] Japan .................................. 4-044014

[51] Int. Cl.⁶ .............................. H04N 1/00; H04N 1/32; G06F 15/00
[52] U.S. Cl. .......................... 358/296; 358/401; 358/438; 358/442; 395/114
[58] Field of Search ..................... 358/296, 401, 358/403, 406, 434–439, 442, 468; 395/114; 355/204–206

[56] References Cited

U.S. PATENT DOCUMENTS

| | | | |
|---|---|---|---|
| 4,058,672 | 11/1977 | Crager et al. | 358/407 X |
| 4,961,185 | 10/1990 | Sawada | 358/442 |
| 4,980,780 | 12/1990 | Tanaka | 358/401 |
| 5,133,048 | 7/1992 | Parsons et al. | 395/114 X |
| 5,282,050 | 1/1994 | Ishizuka et al. | 358/405 |
| 5,386,271 | 1/1995 | Maekawa et al. | 355/204 |
| 5,387,984 | 2/1995 | Nakatani et al. | 358/439 |

FOREIGN PATENT DOCUMENTS

| | | |
|---|---|---|
| 1-291566 | 11/1989 | Japan . |
| 2-178678 | 7/1990 | Japan . |
| 2-259662 | 10/1990 | Japan . |
| 2-259663 | 10/1990 | Japan . |
| 2-259664 | 10/1990 | Japan . |
| 2-259665 | 10/1990 | Japan . |
| 2-259666 | 10/1990 | Japan . |
| 2-257153 | 10/1990 | Japan . |
| 2-257154 | 10/1990 | Japan . |
| 2-257155 | 10/1990 | Japan . |
| 2-257156 | 10/1990 | Japan . |

Primary Examiner—Peter S. Wong
Assistant Examiner—Eric Frahm
Attorney, Agent, or Firm—Finnegan, Henderson, Farabow, Garrett & Dunner

[57] ABSTRACT

In an image processing system, a file server, an image processing apparatus and a terminal unit are connected to a network. The image processing apparatus collects information on available functions, the status of the operation for image processing, and the status of failures and consumable supplies, from a detecting unit, thereby creating a status file and registers it in the file server. The user of the terminal unit obtains the status file from the file server and allows it to be displayed on a display device. This enables the user to find out the functions provided by the image processing apparatus, the status of the operation for image processing, the history of failures, and the like. On the basis of this information, the user can create an operation mode file defining specific image processing, and register it in the file server.

8 Claims, 11 Drawing Sheets

FIG. 5A

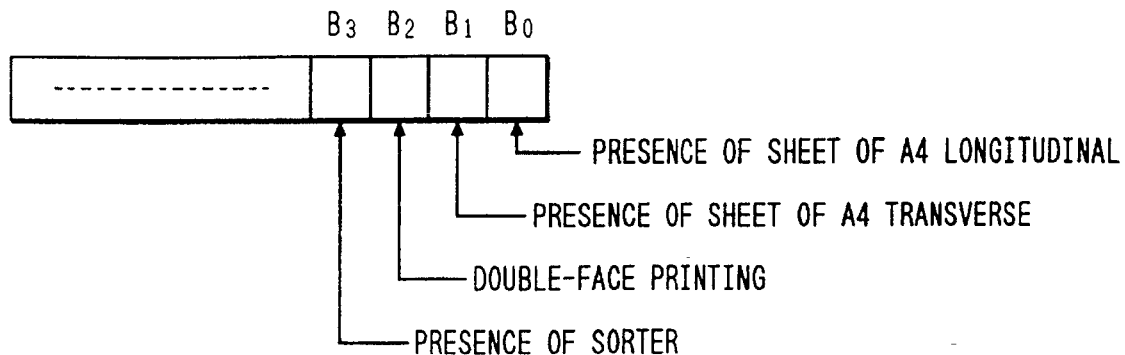

- $B_0$ — PRESENCE OF SHEET OF A4 LONGITUDINAL
- $B_1$ — PRESENCE OF SHEET OF A4 TRANSVERSE
- $B_2$ — DOUBLE-FACE PRINTING
- $B_3$ — PRESENCE OF SORTER

FIG. 5B

```
                    FUNCTION LIST FILE

IMAGE PROCESSING APPARATUS : IMG - 1
NETWORK                    : Net - A
DOMAIN                     : Area - 1
LOCATION                   : XX Building - 4F  S - 401 Copy Room
SUPERVISOR                 : ○○○○
FUNCTIONS AVAILABLE :
    Sheet Tray              A3, A4, B4, B5
    Double-Face Printing    Possible
    Finishing               Sorter, Gathering
    FAX                     Transmission, Reception
    Decomposer              △△△△
```

FIG. 6A    PAPER SIZE    A3    A4    B5

FIG. 6B    PAPER SIZE    ▨A3▨    A4    B5

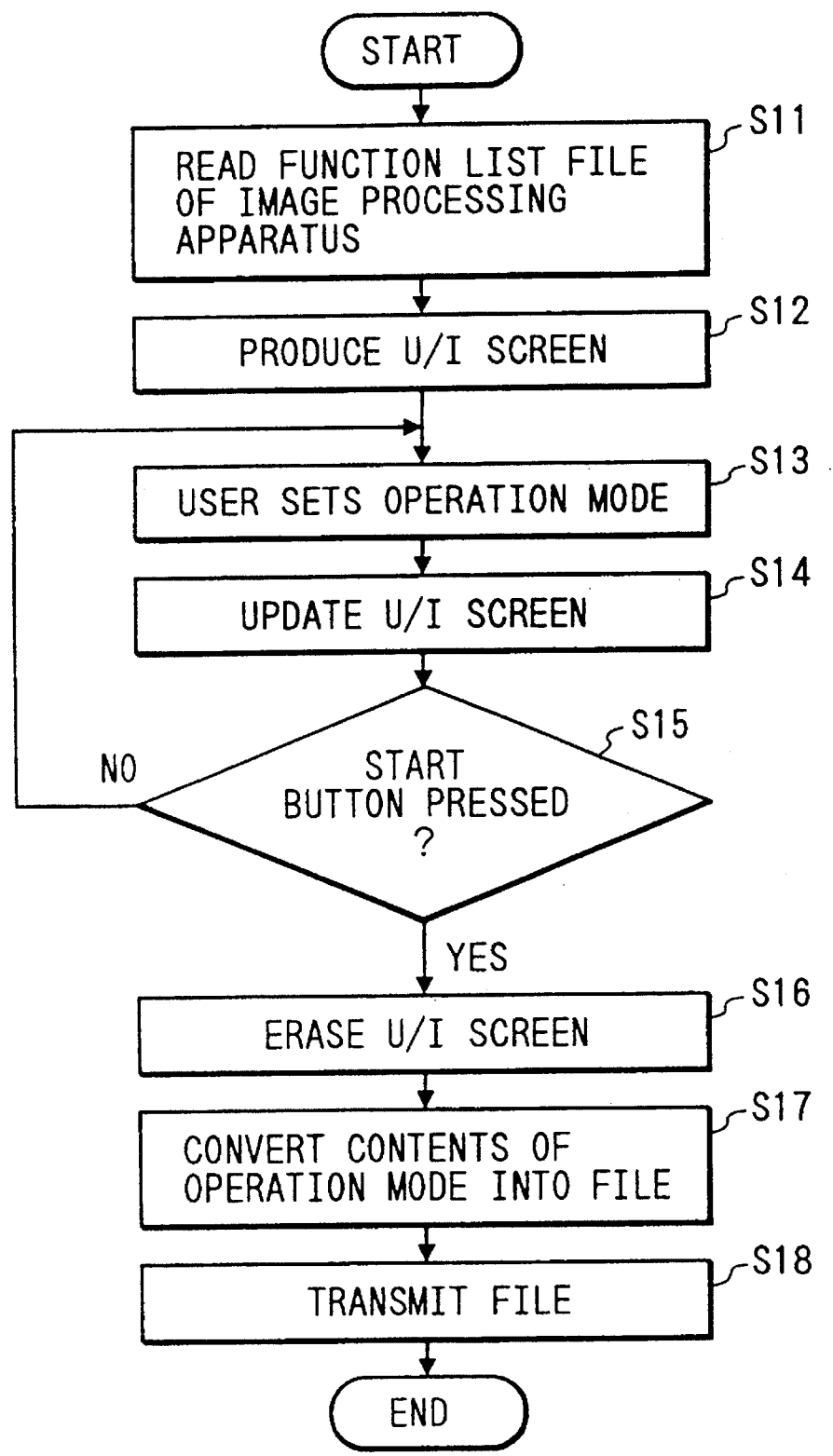

FIG. 13

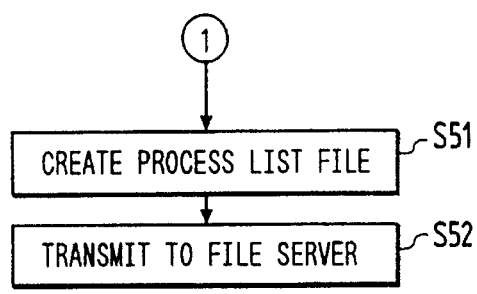

FIG. 14

```
                    PROCESS LIST FILE
IMAGE PROCESSING APPARATUS : IMG - 1
NETWORK                    : Net - A
DOMAIN                     : Area - 1
LOCATION                   : XX Building - 4F  S - 401 Copy Room
SUPERVISOR                 : ○○○○
PROCESS LIST :
Job NO.  Date and Time   Requesting Device   Process       Status of Process
   1     4/10  9:05            WS-1           Print         Print Completed
   2     4/10  9:15            WS-4           FAX Transit   Trans. Completed
   3     4/10  9:35       Operation Panel     Copy          Copy Completed
   4     4/10  9:43           External        FAX Receive   Under Reception
   5     4/10  9:44            WS-2           Print         Wait Print
  ---    ----------       ---------------    -----------    ---------------
  ---    ----------       ---------------    -----------    ---------------
```

```
                    OPERATION STATUS FILE

IMAGE PROCESSING APPARATUS  : IMG - 1
NETWORK                     : Net - A
DOMAIN                      : Area - 1
LOCATION                    : XX Building - 4F  S - 401 Copy Room
SUPERVISOR                  : ○○○○
OPERATION STATUS :
   Date and                   Status of Failures/
   Time                       Consumable Supplies
   91.1/10  10:15                Jam
   91.2/04  13:44                Drum
   91.3/22  17:20                Jam
   91.3/22  17:22                Jam
```

IMAGE PROCESSING SYSTEM HAVING FACILITATED COMMUNICATION BETWEEN AN IMAGE DATA TRANSMITTER AND AN IMAGE PROCESSOR

BACKGROUND OF THE INVENTION

This invention relates to an image processing system in which an image processing apparatus such as a printer is shared through a network.

In a conventional image processing system known as a so-called network printer, an image processing apparatus such as a printer is connected to a network such as a local area network (LAN) to be shared by terminal units including work stations (WSs), personal computers (PCs) and the like which are connected to this network.

In such an image processing system, when text data or graphic data (these two types of data are hereinafter generally referred to as image data) created in a terminal unit are to be output as a hard copy from a printer, the user of the terminal unit must know the functions of the printer before setting an operation mode for the printer. For example, the user must know which size of paper is available in the printer, whether the printer is capable of double-face printing, whether it has a sorter, and whether it is capable of automatic stapling. The user sets the operation mode on the basis of these functions of the printer.

Therefore, conventionally, a method has been adopted in which, for example as shown in Japanese Patent Unexamined Publication No. Hei. 2-178678, instructions defining an operation mode are output as a hard copy, and then the hard copy is fed into and read by the printer so that the operation mode is set. In another conventionally adopted method, a so-called printing protocol is installed on each terminal unit, and, when using a printer, this protocol is used to communicate with the printer to inquire about the functions thereof or the like.

In the method shown in Japanese Patent Unexamined Publication No. Hei. 2-178678, however, it is extremely troublesome to output the instructions for the operation mode as a hard copy.

In the method in which communication is performed using the printing protocol, since direct communication with a printer is necessary in each printing operation, there arise problems that the communication protocol is complicated and also that the printing protocol to be installed on terminal units is extremely large. These problems are noticeable particularly in recent years. Recently, a plurality of printers are often connected to a network, and accordingly these printers are provided with different printing protocols in order to allow terminal units to communicate with them. In this case, each terminal unit is required to install the printing protocols of all the printers connected to the network, or to install a conversion protocol for converting one printing protocol into another. When many printers are connected to the network, therefore, a very large volume of software or hardware is necessary for installing printing protocols or conversion protocols. Furthermore, when the network is to have a new printer having a printing protocol different from those of the existing printers, all the terminal units are required to install a new printing protocol or a conversion protocol for the new printer. This requires extremely troublesome efforts.

After a terminal unit requests a printer to start printing, the user of the terminal unit may sometimes wish to check the status of the printer, e.g., whether printing is properly completed, whether paper has been used up, or whether the printer is incapable of printing due to the malfunction thereof.

In order to meet such a user's demand, some methods have been proposed. In a known method, a printing protocol is used in the same manner as described above to directly communicate with the printer to obtain necessary information. In another known method, as disclosed in Japanese Patent Unexamined Publication No. Hei. 1-291566, units for switching lines coupled to copying machines are respectively connected to terminal units to collect information on the operation status of the copying machines, and collected information is sent to the terminal unit connected to the respective switching units. In other known methods such as disclosed in Japanese Patent Unexamined Publication Nos. Hei. 2-259662, Hei. 2-259663, Hei. 2-259664, Hei. 2-259665, Hei. 2-259666, Hei. 2-257153, Hei. 2-257154, Hei. 2-257155 and Hei. 2-257156, an information collecting unit connected to copying machines through a line collects information on errors or the like from the copying machines.

In the above-described prior art, however, a terminal unit is required to communicate with an image processing apparatus such as a printer in order to collect information on the functions or operation status of the image processing apparatus, information on the status of requested image processing operation, or the like. This leads to the same problems as those described above.

SUMMARY OF THE INVENTION

The invention has been created in order to solve the above-mentioned problems, and has an object of providing an image processing system which can operate with a greatly simplified communication protocol.

Another object of the invention is to provide an image processing system in which a terminal unit can readily recognize the function or operation status of an image processing apparatus.

Still another object of the invention is to provide an image processing system in which the function or operation status of an image processing apparatus recognized by a terminal unit can readily be displayed on a user interface (UI).

In order to achieve the above objects, the invention provides an image processing system including: a network; storage means connected to the network; an image processing apparatus connected to the network; and at least one image data transmitting unit connected to the network to transmit image data, wherein the image data transmitting unit includes: operation mode specifying means for specifying an operation mode of the image processing apparatus; operation mode file creation means for creating an operation mode file on the basis of the operation mode specified by the operation mode specifying means; and operation mode file registration means for registering the operation mode file created by the operation file creation means, in the storage means, and the image processing apparatus includes: image data input means for receiving image data transmitted from the image data transmitting unit to the storage means; and operation mode set means for setting an operation mode for processing the image data received by the image data input means, in accordance with the operation mode file registered in the storage means.

BRIEF DESCRIPTION OF THE DRAWINGS

FIGS. 5A and 5B are diagrams;

FIGS. 6A and 6B are diagrams.

FIG. 9 is a flowchart illustrating the operation for the creation of an operation mode file.

FIG. 13 is a flowchart illustrating the operation in the creation of the process list file.

FIG. 14 is a diagram illustrating the process list file.

DETAILED DESCRIPTION OF THE PREFERRED EMBODIMENTS

Hereinafter, embodiments of the invention will be described with reference to the accompanying drawings.

Figure 1:
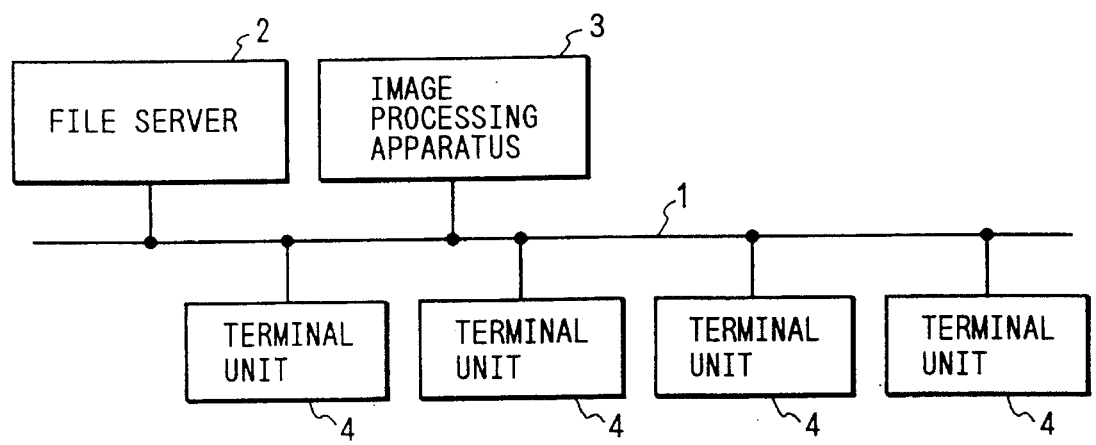
FIG. 1 is a block diagram showing the configuration of an embodiment of the invention.

FIG. 1 is a diagram showing the entire configuration of an embodiment of the image processing system of the invention. To a network 1 such as a LAN, a file server 2, an image processing apparatus 3 and a plurality of terminal units 4 are connected.

Figure 2:
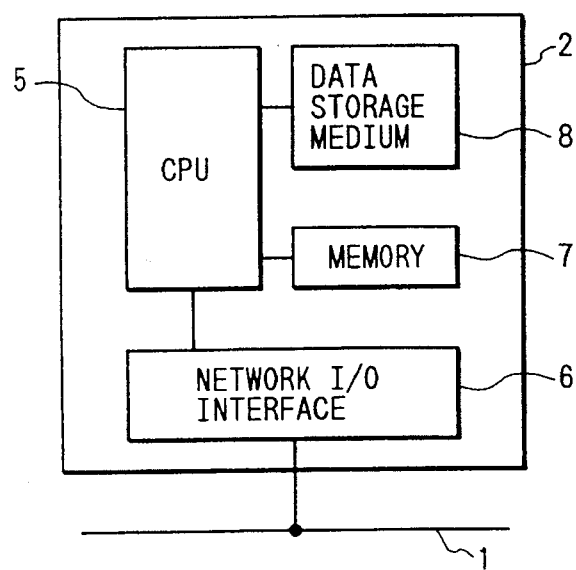
FIG. 2 is a block diagram showing an example of the configuration of a file server.

The file server 2 which functions as storage means of the invention stores various file data transmitted through the network 1 from the image processing apparatus 3 and terminal units 4, or sends specified file data to the image processing apparatus 3 or terminal units 4 when requested. The file server 2 includes, for example as shown in FIG. 2, a central processing unit (CPU) 5 for supervising and controlling the operation of the file server 2, a network input/output interface 6 for receiving and sending data, and a memory 7 and data storage medium 8 for storing data. In this embodiment, the memory 7 is a random access memory (RAM), and the data storage medium 8 is a large capacity storage medium such as a hard disk.

When the image processing apparatus 3 or terminal unit 4 gives a request to register a file, the CPU 5 specifies the directory and file name to be used for the storage of the received data of the file, and then allows the file to be stored in the memory 7 or data storage medium 8. When the image processing apparatus 3 or terminal unit 4 gives a request to read out a file, the CPU 5 reads out the file from the memory 7 or data storage medium 8, and then transfers the file to the unit 3 or 4 which has given the request.

Figure 3:
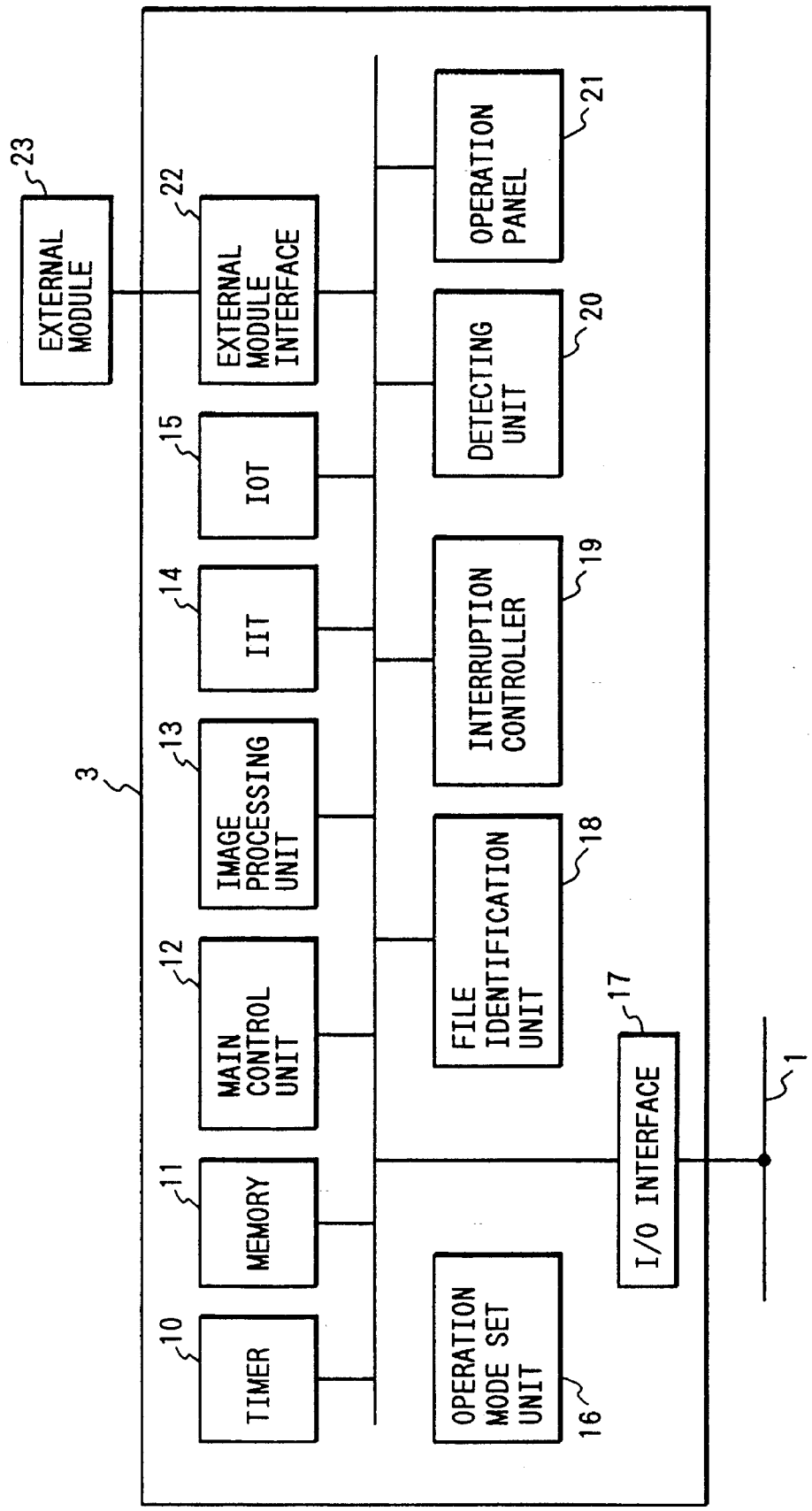
FIG. 3 is a block diagram showing an example of the configuration of an image processing apparatus.

The image processing apparatus 3 generally performs a wide variety of image processing operations. It may or may not include printing means. In this embodiment, the image processing apparatus 3 includes printing means. It is apparent that, for example, the image processing apparatus 3 may have only the function of decomposing text data into bit map data. FIG. 3 shows an example of the configuration of the image processing apparatus 3.

In FIG. 3, a timer 10 functions as an interval timer which notifies an interruption controller 19 of the elapse of a predetermined time period. This time period is set by a main control unit 12.

A memory 11 includes a ROM, RAM and the like. In the ROM, for example, programs for operating the main control unit 12 and the like are stored. The RAM has, for example, working areas for the main control unit 12, and storage areas for storing information on operations performed in the past, reserved data transmission and, the like.

The main control unit 12 supervises and controls the entire operation of the image processing apparatus 3, and includes a microcomputer and its peripheral circuits.

An image processing unit 13 performs image processing on the basis of an operation mode set by an operation mode set unit 16. In this image processing, it is necessary to correlate image data with the operation mode for every identification numbers of the terminal units 4 from which the image processing has been requested and the user who has requested image processing. This correlation can be carried out by dividing directory into individual sections for terminal units and users. The correlation cannot be done without clarifying the time sequence of an image data file and an operation mode file defining the operation mode. In general, however, file storage management is based on the time. When files are processed in the order in which the files were stored, therefore, the correlation can readily be carried out.

An image input terminal (IIT) 14 reads the image of an original by means of a CCD line sensor or the like, and generates digital image data.

An image output terminal (IOT) 15 produces a hard copy on the basis of bit-mapped image data.

The operation mode set unit 16 determines which kind of image processing is to be carried out for each image data, in accordance with an operation mode file defining an operation mode. As described above, the operation mode and the image data are correlated with each other for the identification number of each terminal unit and the user.

An input/output interface 17 sends data to or receives them from external devices.

On receiving an interruption request signal from the interruption controller 19, a file identification unit 18 searches a predetermined directory in the file server 2 for a file addressed to the image processing apparatus 3. In the case where the required file exists, the file identification unit 18 checks an extension code attached to the name of the file, a header which is written in a specific file to indicate the file type, etc. to judge which type of file it is. There are different types of files such as image data files, files defining an operation mode for image processing, etc. When extension codes are uniformly used, for example, the extension codes attached to image data files are all "TIF" and those attached to operation mode defining files are all "TCR", the file type can readily be identified by the extension code. The file identification unit 18 actuates the operation mode set unit 16 in the case where the file has been identified as an operation mode defining file, or actuates the image processing unit 13 in the case where the file has been identified as an image data file.

The interruption controller 19 gives an interruption request to the file identification unit 18 and to a detecting unit 20 at regular time intervals determined by the timer 10.

Using sensors located in various places, the detecting unit 20 detects malfunctions in the image processing apparatus 3 such as the jamming of an original paper in the IIT 14, the lack of paper stock or paper jamming in the IOT 15, or other failures. The detecting unit 20 then notifies the main control unit 12 of the detected malfunctions as error information. The detecting unit 20 also detects the functions of the IOT 15 such as the type of paper tray used therein, the presence of paper stock, and the type of finishing, or detects the functions of the image processing apparatus 3 such as the type of image processing provided by the image processing unit 13. The detecting unit 20 sends the information on the detected functions to the main control unit 12. Since these detecting operations are well known, the detailed description thereof is omitted. The detecting operations are carried out when an interruption request is given by the interruption controller 19.

An operation panel 21 is used to specify the operation mode of the image processing apparatus 3. For example, it is used when the image of an original placed on the IIT 14 is to be printed by the IOT 15.

The image processing apparatus 3 includes an external module interface 22 through which the image processing apparatus 3 can be connected to an external module 23. The external module 23 may be, for example, a facsimile apparatus or a decomposer. Alternatively, the image processing apparatus 3 itself can also be used as the external module 23 to be connected to another image processing apparatus. Although only one external module 23 is shown in FIG. 3, a plurality of external modules may be connected to the image processing apparatus 3.

The operation of the image processing apparatus 3 will be described later.

Next, the configuration of the terminal unit 4 will be described. The terminal unit 4 can send and receive image data to be processed and file data of a predetermined format. The terminal unit 4 is composed of, for example, a WS, PC, and the like.

Figure 4:
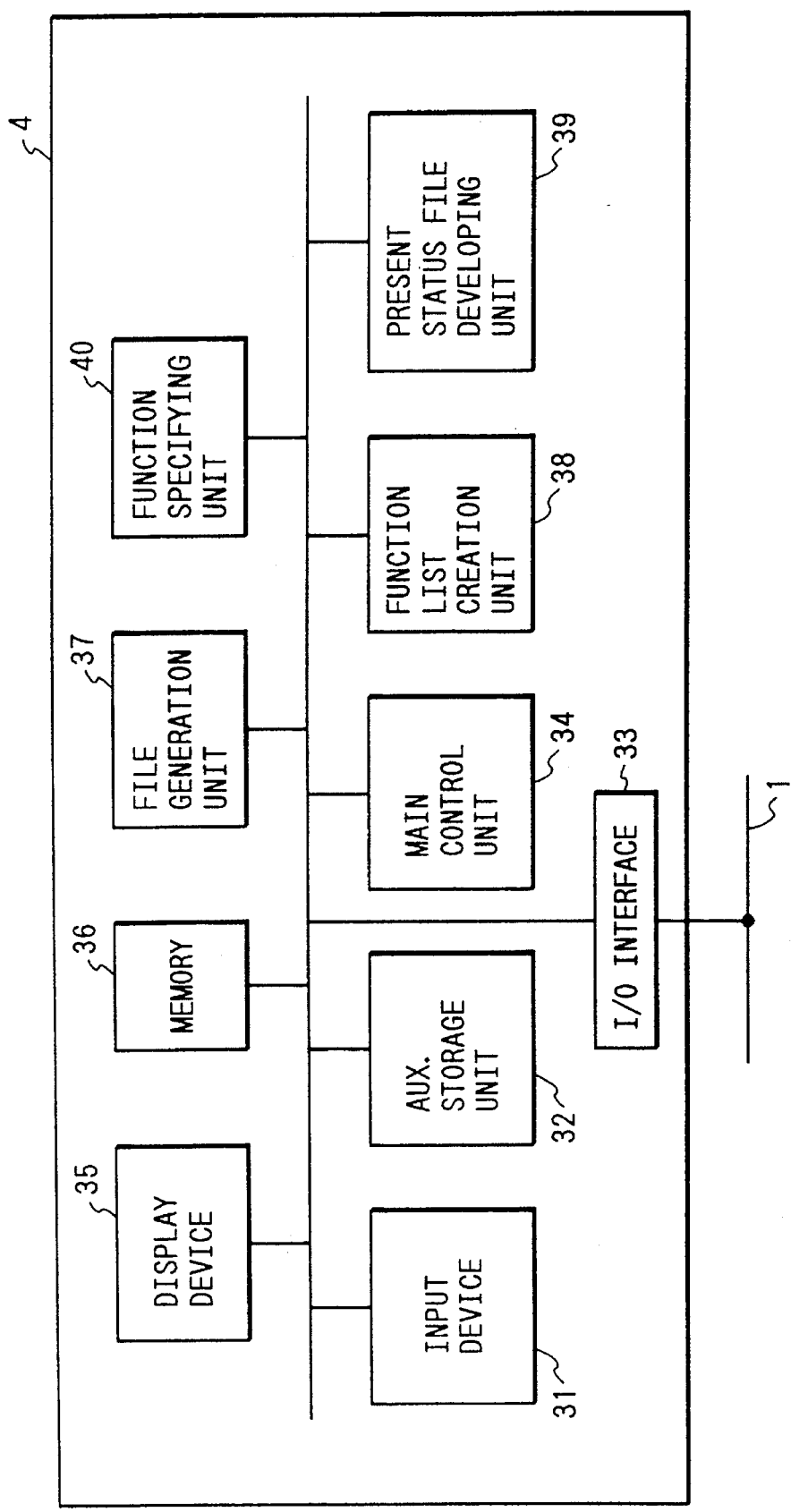
FIG. 4 is a block diagram showing an example of the configuration of a terminal unit.

FIG. 4 is a view showing an example of the configuration of the terminal unit 4. An input device 31 is used to create image data or enter instructions for an operation mode. The input device 31 includes a keyboard, a pointing device, or the like.

An auxiliary storage unit 32 includes, for example, a hard disk or the like, and stores a variety of programs and files. Programs are stored in a memory 36 under the control of a main control unit 34 and executed thereby, in accordance with instructions from the input device 31, etc.

An input/output interface 33 transfers data to or receives them from external devices.

The main control unit 34 supervises and controls the entire operation of the terminal unit 4, and includes a microcomputer and its peripheral circuits.

A display device 35 is used as a user interface (UI), and is herein composed of a CRT.

The memory 36 includes a RAM which has areas for storing programs read out from the auxiliary storage unit 32, working areas for storing programs, and the like.

When an operation mode defining image processing to be performed by the image processing apparatus 3 is set, a file generation unit 37 generates an operation mode file, while providing the operation mode data with information such as a header indicating that the file specifies the operation mode, a terminal unit identification number indicating the terminal unit which sends the file, a user identification number indicating the user who creates the file, and the like. The operation mode file thus generated by the file generation unit 37 is sent to the file server 2 through the input/output interface 33 under the control of the main control unit 34 immediately after the generation of the file or after once stored in the memory 36 or auxiliary storage unit 32.

A function list creation unit 38 fetches a function list file which is created by the image processing apparatus 3 and stored in the file server 2, and converts the function list file into data which can be displayed on the display device 35, e.g., bit map data.

The function list file may have any of a variety of structures. For example, when the function list file is composed of binary data, as shown in FIG. 5A, each bit is associated with each function of the image processing apparatus 3. A bit is set to "1" when the image processing apparatus 3 has the function corresponding to the bit, while it is set to "0" when the image processing apparatus 3 does not have the corresponding function. In this case, the function list creation unit 38 includes data representing in the form of a bit map all the functions which are previously defined in the function list file. The bit map data are so processed that the functions indicated by "0" in the function list file will be covered with a half-tone screen when displayed. This will be described more specifically. For example, assuming that three paper sizes, i.e., A3, A4 and B5 are defined in the function list file, the function list creation unit 38 includes bit map data indicative of the paper sizes, as shown in FIG. 6A. When a reference of the bits constituting the function list file shows that the paper sizes of A4 and B5 are available and that the size of A3 is not available, the portion of the bit map data corresponding to "A3" is covered with a half-tone screen as shown in FIG. 6B, and displayed on the display device 35. This enables the user to readily recognize the paper sizes currently available in the image processing apparatus.

The function list file may also be composed of ASCII codes. Using ASCII codes, the image processing apparatus 3 prepares such a function list file as shown in FIG. 5B, from the information on its detected functions and additional information. In this case, the function list creation unit 38 is required only to convert the fetched function list file into bit map data, the function list shown in FIG. 5B is displayed as it is on the screen of the display device 35. The function list file is herein composed of ASCII codes.

A present status file developing unit 39 will be described. The image processing apparatus 3 creates a process list file indicating the present status thereof and an operation status file indicating the history of the malfunctions thereof or the like, and then registers the resultant files in the file server 2, as will be described later. When the process list file or operation status file of the image processing apparatus 3 is requested by the user through the input device 31 to be displayed, the present status file developing unit 39 fetches the requested file from the file server 2, and converts it into a bit map which can be displayed on the screen of the display device 31. The process list file and operation status file may have any of a variety of file structures. When they are composed of ASCII codes in the same manner as the function list file, the present status file developing unit 39 may essentially include a decomposer.

When the user selects one of the functions of the image processing apparatus 3 displayed on the screen of the display device 35, a function specifying unit 40 causes the selected function to be displayed in a different manner, and also finally sets the selected function, i.e., the operation mode.

Figures 7, 10:
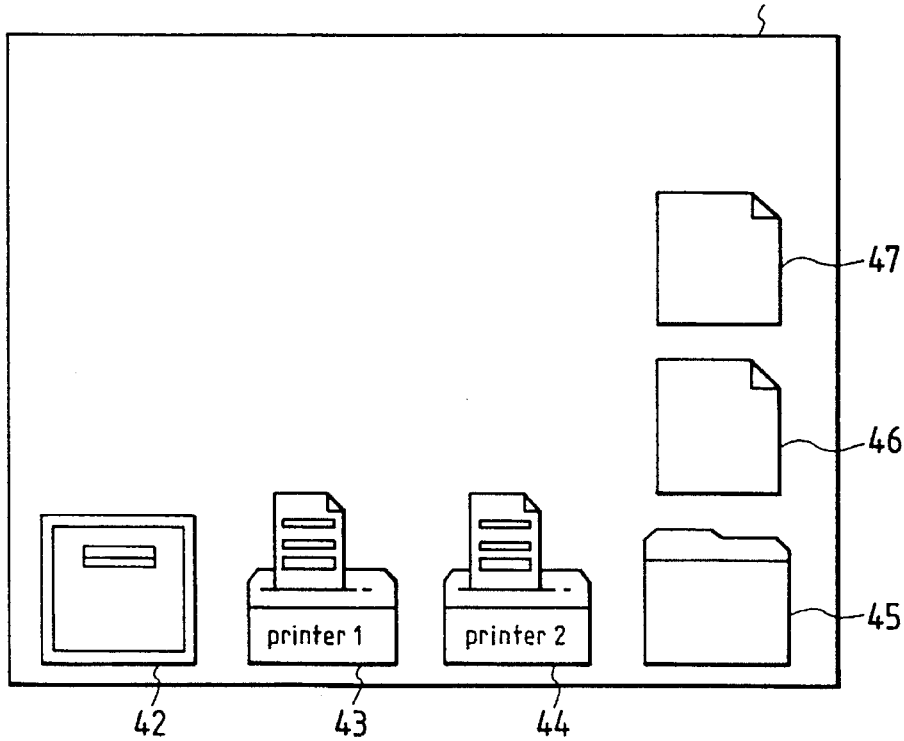
FIG. 7 is a diagram illustrating the operation of a function specifying unit.
FIG. 10 is a view showing an example of a menu on the display screen.

This enables the user to clearly recognize which function the user has selected. Specifically, the user operates the input device 31 to set operation modes such as the number of sheets to be printed, paper size, and the like, while viewing the function list file displayed on the display device 35. The function specifying unit 40 performs negative-positive inversion or half-tone screening on the areas corresponding to the functions selected in this setting operation, so that the selected functions displayed on the display device 35 can readily be distinguished from nonselected ones. FIG. 7 is a view showing an example of the thus displayed function list in which "A4" has been selected for paper size, "PRN1" for the data receiving unit, and "Facsimile" for the output unit. When the paper size is changed to "B4" in the state of FIG. 7 before the operation mode is finally set, the function specifying unit 40 removes the half-tone screen from the data area corresponding to "A4", and provides a half-tone screen to that corresponding to "B4".

In the above-described manner, the operation mode is set. After the operation mode is finally set, the function specifying unit 40 allows the data on the operation mode to be written in the memory 36. The operation mode data can be written in the memory 36 in any of various ways. For example, an area assigned for specifying functions is prepared in the memory 36, and in the same manner as shown in FIG. 5A, each bit in the area is associated with each function so that a bit is set to "1" or "0" when the corresponding function is required or not required. When the indication of information such as a telephone number is needed, an area sufficient for the storage of such information is provided so that the information is written in this area using ASCII codes or the like.

Then the file generation unit 37 reads out the operation mode data, and creates an operation mode file from the operation mode data, in the same manner as described above. The created operation mode file is transmitted to the file server 2.

The configurations of the file server 2, image processing apparatus 3 and terminal unit 4 and the operations of the components thereof have been heretofore roughly described. Next, the operations of the image processing apparatus 3 and terminal unit 4 will be described in detail.

Figure 8:
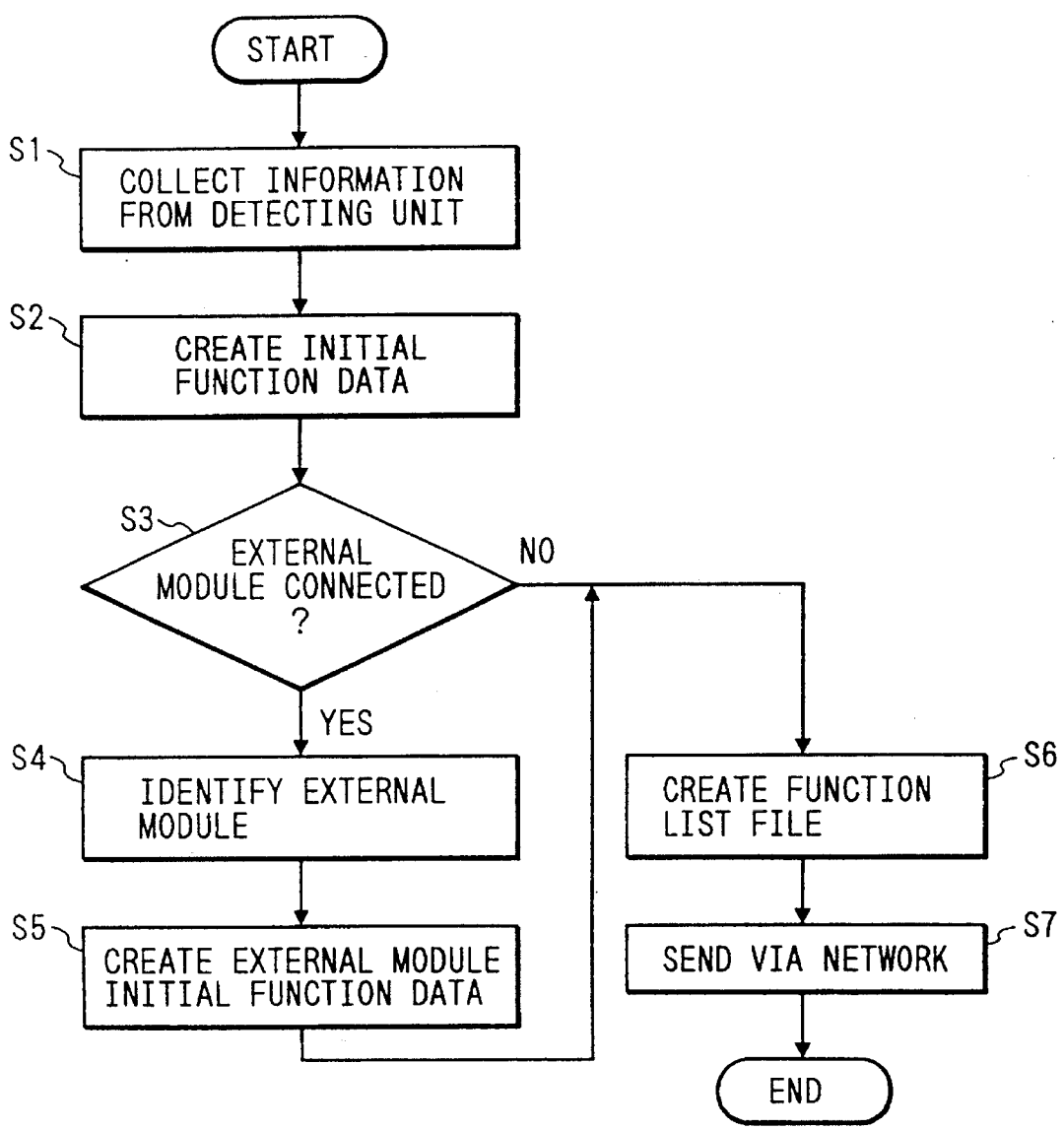
FIG. 8 is a flowchart illustrating the operation for the creation of the function list file.

When the power is turned on, the main control unit 12 of the image processing apparatus 3 performs the startup operation of the entire apparatus in a usual manner. When the startup operation is ended, the main control unit 12 collects information on the available functions of the image processing apparatus 3 from the detecting unit 20, and creates a function list file. This operation is carried out as shown in the flowchart of FIG. 8. First, the main control unit 12 collects information on the functions of the image processing apparatus 3 from the detecting unit 20 (step S1). The main control unit 12 then creates initial function data indicating the list of functions in the initial state, on the basis of the collected data, and allows the resultant data to be stored in the memory 11 (step S2). As described above, interrupts caused by the interruption controller 19 allow the detecting unit 20 to detect the functions and status of the components of the image processing apparatus 3 at predetermined time intervals.

Next, the main control unit 12 judges whether the external module 23 is connected to the image processing apparatus 3, from the information given by the external module interface 22 (step S3). When the external module 23 is connected, the main control unit 12 communicates with the external module 23 to identify the type thereof (step S4), collects information on the functions of the external module 23 to create external module initial function data, and then stores the resultant data in the memory 11 (step S5). In the case where a plurality of external modules are connected, the operation of steps S3 to S5 is performed on every external module.

Next, the main control unit 12 reads out the initial function data created in step S2 and also the external module initial function data created in step S5, from the memory 11, and combines these two sets of initial function data to create a function list file such as shown in FIG. 5B using ASCII codes (step S6). The main control unit 12 provides a directory previously assigned thereto and a file name to the function list file, and sends the resultant file through the network 1 to the file server 2 so that the file is registered therein (step S7). The example of the function list file shown in FIG. 5B indicates as that available functions, a paper size can be selected from the sizes of "A3", "A4", "B4" and "B5", that double-face printing can be performed, and that sorting and gathering functions can be used as finishing. This function list file also indicates that the image processing apparatus functions as a facsimile apparatus capable of sending and receiving data and also functions as a o decomposer. This function list file includes additional information, i.e., the names of the image processing apparatus and network, the domain, the location, and the name of the supervisor of the image processing apparatus. Such additional information is previously input through the operation panel 21 or the like to be stored in the memory 11 or the like, when the image processing apparatus 3 is installed at its place. The main control unit 12 fetches this previously stored information from the memory 11 when creating a function list file in step S6.

The function list file thus sent from the image processing apparatus 3 is received by the file server 2 in which the received file is provided with directory and file names specified by the CPU 5, and stored in the data storage medium 8.

In the operation shown in FIG. 8, a function list file is created only when the power is turned on. It is obvious to those skilled in the art that the operation can be repeated at predetermined time intervals. In this case, when the operation mode for the image processing apparatus 3 is changed, such a change can be immediately reflected in the function list file.

The procedure for registering a function list file has been heretofore described. Next, the operation of the terminal unit 4 for setting an operation mode will be described with reference to the flowchart of FIG. 9.

When the user of the terminal unit 4 has prepared a document or figure and requests a desired image processing apparatus 3 to perform desired image processing on the document or figure, the user first allows the display device 35 to display a predetermined menu thereon and selects the desired image processing apparatus 3 from the menu. An example of the menu screen is shown in FIG. 10. On a screen 41 of the display device 35, different kinds of icons 42 to 47 are displayed. In FIG. 10, the icon 42 represents a directory, the icon 43 represents an image processing apparatus, the icon 44 represents an image processing apparatus different from that represented by the icon 43, the icon 45 represents a directory different from that represented by the icon 42, the icon 46 represents a document, and the icon 47 represents a document different from that represented by the icon 46. Since the way of displaying such a menu is well known, the detailed description thereof is omitted.

When the user selects using the input device 31 the image processing apparatus represented by the icon 43 on the display screen shown in FIG. 10, the main control unit 34 actuates the function list creation unit 38. The function list creation unit 38 then requests the file server 2 to transfer the function list file of this image processing apparatus. At this request, the CPU 5 of the file server 2 reads out the requested function list file from the data storage medium 8, and sends the file to the terminal unit 4 through which the request has been made. This operation causes the function list creation unit 38 of the terminal unit 4 to obtain the function list file of the requested image processing apparatus. This process is done in step S11 of FIG. 9.

On the basis of the thus obtained function list file, the function list creation unit 38 produces a display screen indicating the functions of the image processing apparatus 3 and the additional information thereof (step S12). The resultant display screen is displayed on the screen of the display device 35. In this manner, the display device 35 displays such a screen as shown in FIG. 5B. As described above, since the function list file is composed of ASCII codes, the function list creation unit 38 is required only to convert the codes into a bit map.

When the function list is displayed on the display device 35, the user selects a desired function using the input device 31 to set a desired operation mode (step S13). At this time, the function specifying unit 40 detects the location of the pointed item on the screen of the display device 35, and provides negative-positive inversion or a half-tone screen to the display area corresponding to the requested function as described above to allow the function to be displayed in a different manner, thereby updating the display (step S14). Thereafter, when the operation mode is finally set, the function specifying unit 40 picks up all the functions selected from the function list file, and allows the data including the selected functions to be written as operation mode data in a predetermined area of the memory 36.

Thereafter, when the main control unit 34 recognizes that the start button of the input device 31 has been pressed (step S15), it erases the display screen from the display device 35 (step S16) and actuates the file generation unit 37. The file generation unit 37 then reads out the operation mode data from the predetermined area of the memory 36, and provides the operation mode data with additional information such as a header indicating that the file specifies an operation mode, the terminal unit identification number, and the user identification number, thereby creating an operation mode file (step S17). The resultant operation mode file is sent to a predetermined directory in the file server 2 by the main control unit 34 (step S18).

In the above-described manner, the operation mode file transmitted from the terminal unit 4 is received by the file server 2 where the received file is stored in the data storage medium 8 with the directory and file names specified by the CPU 5.

The operation of the image processing apparatus 3 for fetching an operation mode file and carrying out requested image processing will be described below with reference to FIG. 11.

Every time an interruption request is produced by the interruption controller 19, the file identification unit 18 of the image processing apparatus 3 searches a predetermined directory in the file server 2 for a file addressed to this image processing apparatus 3, and judges whether such a file exits or not (step S21). When the required file exists, the file identification unit 18 refers the extension code attached to the name of the file, the header, or the like to judges which type of file it is (step S22). When the file is judged to be an operation mode file, the file identification unit 18 actuates the operation mode set unit 16.

The operation mode set unit 16 then checks the terminal unit identification number, user identification number, and the like, attached to the file to determine which user created the operation mode file and which terminal unit sent it (step S23). The operation mode set unit 16 allows the operation mode file to be stored in the memory 11 for every corresponding terminal unit and user (step S24).

When the file is judged to be an image data file in step S22, the file identification unit 18 transmits the image data to the image processing unit 13 (step S25). In this process, the file identification unit 18 sends information on the terminal unit which transmitted the image data and on the user of the terminal. Based on this information, the image processing unit 13 searches the memory 11 for an operation mode file defining the operation mode corresponding to the image data, and performs requested image processing on the image data in accordance with the operation mode (step S26). When the required image processing is a printing process, the image data is transferred from the image processing unit 13 to the IOT 15 to be printed on a sheet of a specified size. When the required image processing is a process which requires only internal electric processing, for example, decomposition, data compression, or rotational shifting of the image, the image processing unit 13 carries out the required image processing and then allows the resulting data to be stored in the memory 11. Furthermore, when the external module 23 is a facsimile apparatus and the required image processing is the facsimile transmission therefrom, the image processing unit 13 transfers the image data through the external module interface 22 to the external module 23 which in turn transmits the image data.

As a result of the above-described operation, the user can make the desired image processing apparatus 3 carry out the desired image processing.

Figure 12:
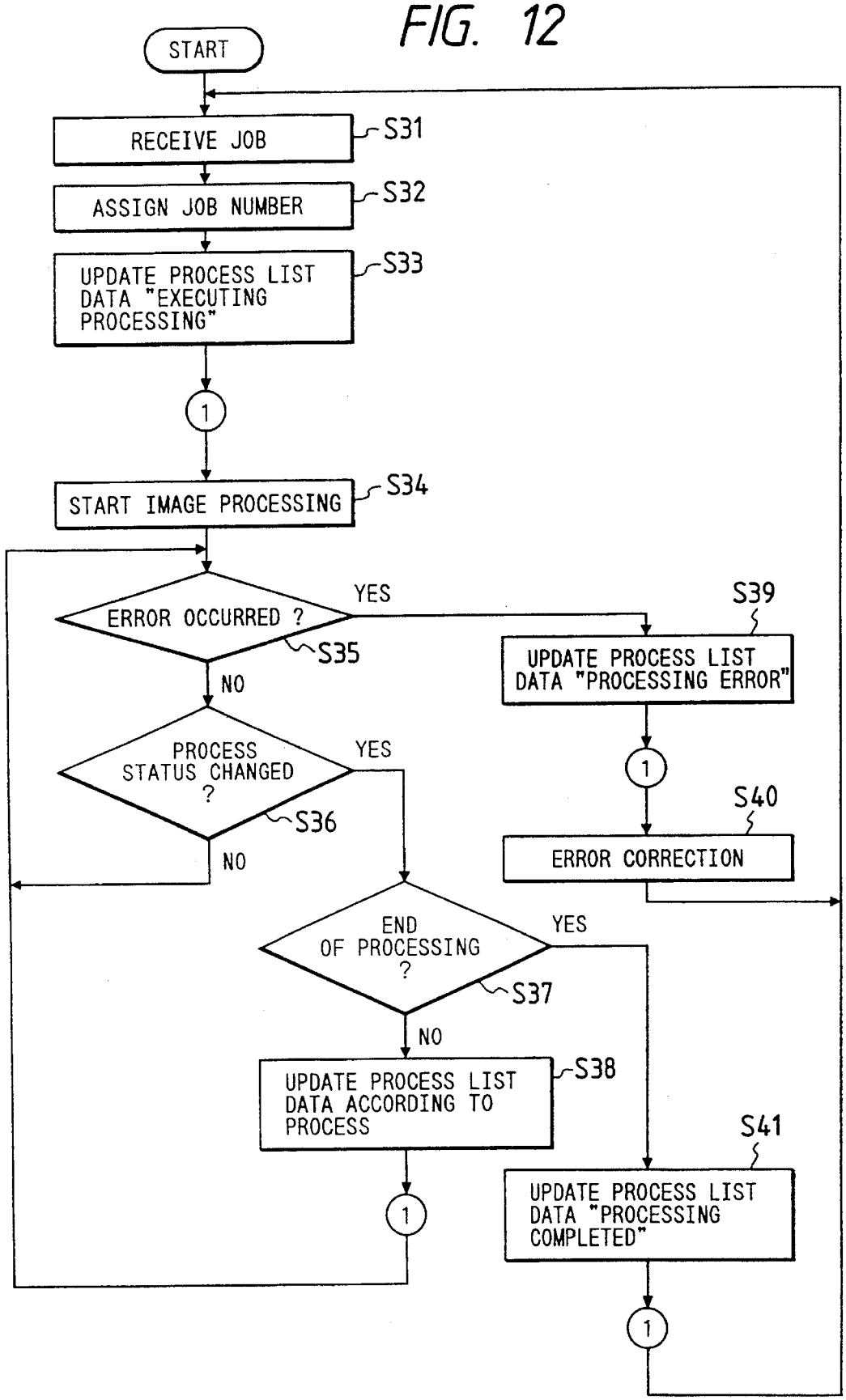
FIG. 12 is a flowchart illustrating the operation in the creation of a process list file.

Next, the operation of the image processing apparatus 3 for creating a process list file while carrying out image processing will be described with reference to FIGS. 12 and 13.

Figure 11:
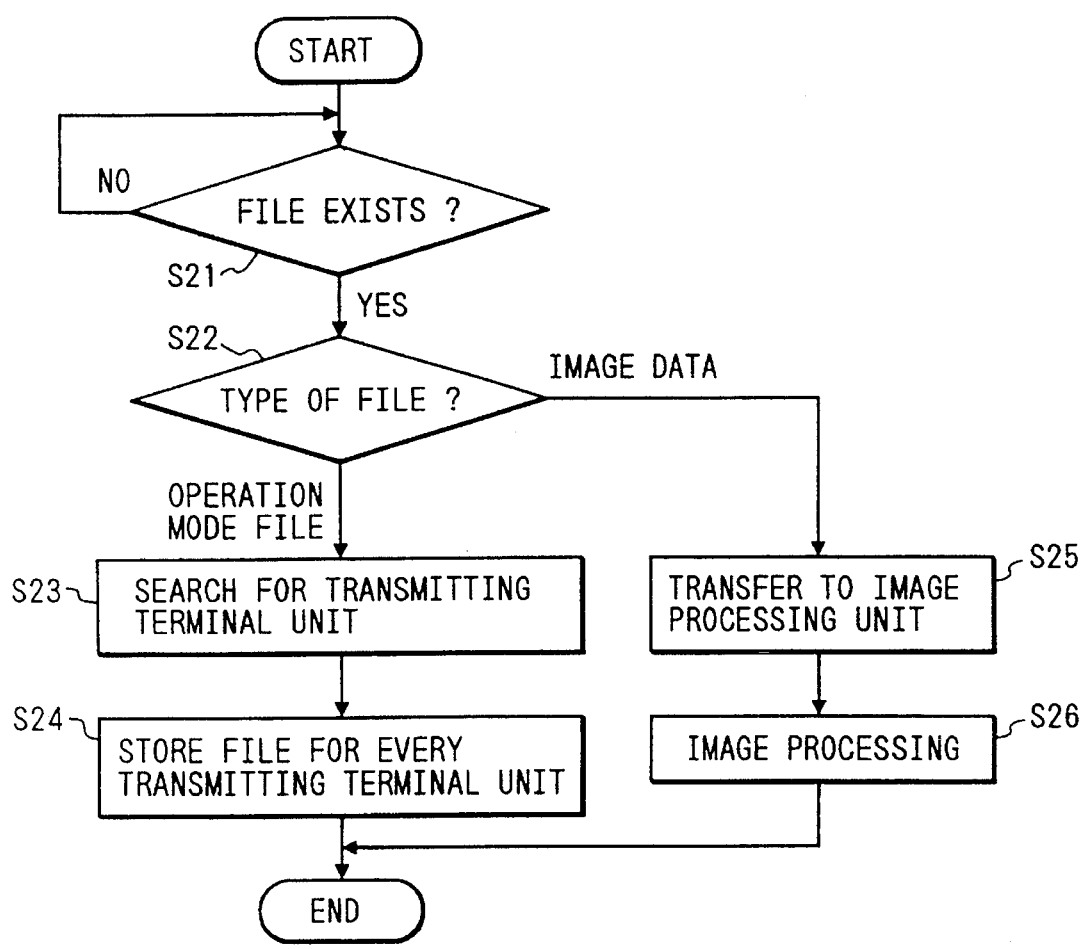
FIG. 11 is a flowchart illustrating the operation in image processing.

When the operation shown in FIG. 11 is effected, the image processing apparatus 3 receives a job (step S31), and assigns a predetermined job number to the received job (step S32) so that a unitary job management can be carried out. In assigning job numbers, properly arranged numbers, e.g., serial numbers can be given to the jobs requested by each terminal unit and each user.

After assigning the job number, the main control unit 12 writes the job number and codes indicative of "Executing Processing" in process list data which are stored in a predetermined area of the memory 11, thereby updating the process list data (step S33). The codes used here are ASCII codes.

The main control unit 12 adds predetermined additional information to the thus updated process list data, thereby creating a process list file (step S51 in FIG. 13). The main control unit 12 transmits the resultant process list file to a predetermined directory of the file server 2 (step S52), and directs the image processing unit 13 to initiate image processing. In this manner, the image processing unit 13 starts to carry out image processing as defined by the operation mode file (step S34).

Thereafter, the main control unit 12 obtains information on the status of the components at predetermined time intervals from the detecting unit 20, and judges on the basis of the obtained information whether an error has occurred or not (step S35). In the case where an error is found, the main control unit 12 writes "Processing Error" in a data area for the corresponding job number in the process list data, thereby updating the process list data (step S39). Based on the updated process list data, the main control unit 12 creates a process list file (step S51), transmits it to the file server 2 (step S52), carries out error correction (step S40), and then returns to a state of waiting a job request.

When no errors are found in step S35, the main control unit 12 then judges whether the status of the currently performed processing has been changed or not (step S36). When no change is found, the judgment process in step S35 is repeated. When a status change of the currently performed processing is found, the main control unit 12 further judges whether the change has been caused by the completion of the processing (step S37). When the change is judged to be caused by the completion of the processing, the main control unit 12 writes "Processing Completed" in the data area for the corresponding job number in the process list data, thereby updating the process list data (step S41). Based on the updated process list data, the main control unit 12 creates a process list file (step S51), transmits it to the file server 2 (step S52), and then returns to a state of waiting a job request. When the cause of the change is not the completion of the process, the main control unit 12 creates data in accordance with the change, and writes it in the process list data, thereby updating the process list data (step S38). Based on the updated process list data, the main control unit 12 creates a process list file (step S51), transmits it to the file server 2 (step S52), and returns to step S35.

The above procedure will be specifically described. It is assumed that the operation mode file defines, for example, the facsimile transmission of predetermined image data from the external module 23 which serves as a facsimile apparatus. First, the facsimile 23 dials the number of the defined facsimile receiver. When the transmission line for the facsimile receiver is being used, the facsimile apparatus 23 must wait before initiating the required transmission. In this case, for example, a message such as "Wait for Fax Transmission" is written in the process list data in step S38. When the transmission line becomes available thereafter, the facsimile apparatus 23 is allowed to initiate the transmission of the image data, and the main control unit 12 judges in step S36 that the status of the processing has been changed and updates the process list data by writing, for example, "Executing Fax Transmission" therein in step S38. When the transmission of the image data is completed, "Processing Completed" is written in the process list data.

The process list file sent from the image processing apparatus 3 to the file Server 2 as described above is stored with predetermined directory and file names in the data storage medium 8.

When the user who requested a job wishes to know the status of the processing for the job, the user performs a predetermined operation through the input device 31 of the terminal unit 4. This causes the main control unit 34 to actuate the present status file developing unit 39. The present status file developing unit 39 fetches the process list file of the required image processing apparatus from the file server 2, and converts the process list file into a bit map and then transfers it to the display device 35. This causes the display device 35 to display a process list file such as shown in FIG. 14. Since the process list file is composed of ASCII codes as described above, the present status file developing unit 39 is only required to include a decomposer for converting ASCII codes into a bit map.

In FIG. 14, the date and time when the job was received, the device which requested the job, the type of processing, and the status of the processing are listed for each job number. The "Copy" shown as the type of processing represents a job in which the image of an original placed on the IIT 14 is to be printed out by the IOT 15. In this case, the instructions for the job such as the number of sheets to be printed are entered from the operation panel 21, so that "Operation Panel" is indicated as the device requesting the job. When the type of processing is facsimile receiving, "External" is indicated as the job-requesting device because the job is requested from an external device. As the job-received date and time, the value obtained from the timer 10 is displayed. The job-requesting device can be identified on the basis of information given by the input/output interface 17 or external module interface 22.

In the same manner as the function list file, the process list file additionally includes information on the name of the image processing apparatus, the name of the network, the domain, the location, and the name of the supervisor of the image processing apparatus.

Thus, the user of the terminal unit 4 can find out whether a requested job has been completed, by causing the process list file to be displayed as required. Furthermore, by causing the process list file to be displayed in advance of requesting a job, the user can find out whether he can request the image processing apparatus to execute the job.

The operation regarding the process list file is effected as described above.

In general, failures may sometimes occur in the components of the image processing apparatus 3. For example, in the IOT 15, the jamming of paper may arise and the lifetime of its photoreceptor may expire. The information on the history of such failures is very important for the supervisor or customer engineer of the image processing apparatus 3. Therefore, the image processing apparatus 3 is so arranged as to create an operation status file defining the history of failures, and to allow the operation status file to be registered in the file server 2. This process is carried out as follows.

Figures 15, 16:
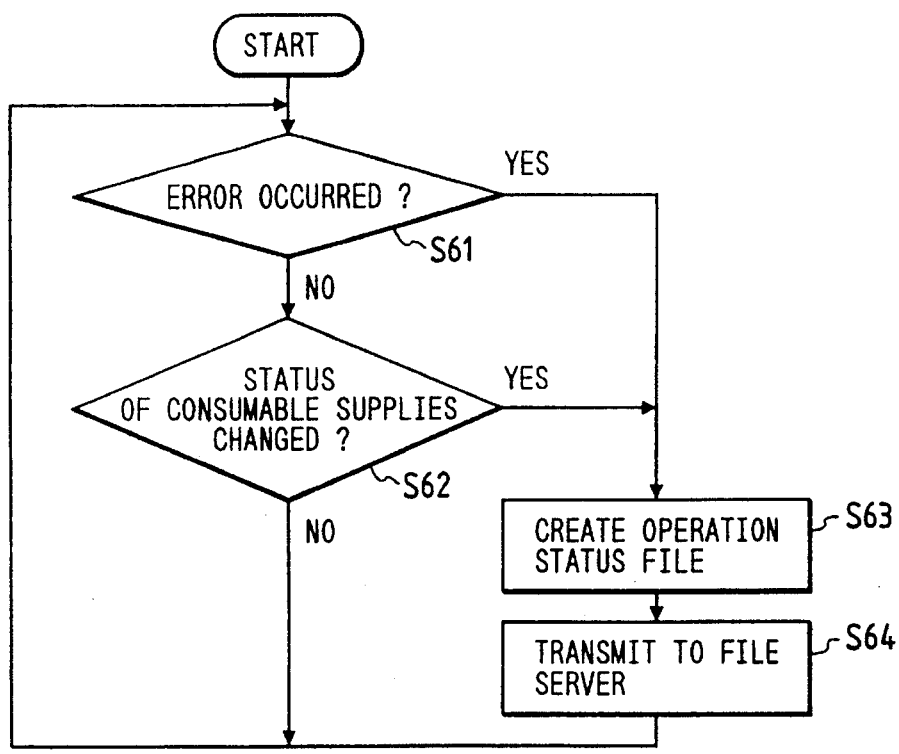
FIG. 15 is a flowchart illustrating the operation for the creation of an operation status file.
FIG. 16 is a diagram illustrating the operation status file.

While the power is on, the main control unit 12 repeats the procedure shown in FIG. 15 at predetermined time intervals. First, the main control unit 12 obtains, from the detecting unit 20, information on the status of the components at predetermined time intervals. Based on the information obtained, the main control unit 12 judges whether an error has occurred or not (step S61). When an error is found, or when the main control unit 12 judges in step S62 that the status of consumable supplies in the components is changed, e.g., when the lack of paper stock or the deterioration of the photoreceptor of the IOT 15 is found, an operation status file is created in the same manner as the above-described function list file and process list file (step S63), and transmitted to the file server 2 (step S64). The operation status data are herein composed of ASCII codes.

The operation status file thus transmitted from the image processing apparatus 3 to the file server 2 is stored with predetermined directory and file names in the data storage medium 8.

When the supervisor or customer engineer for image processing apparatuses wishes to check the operation status of a desired image processing apparatus 3, he performs a predetermined operation through the input device 31 of the terminal unit 4. This causes the main control unit 34 to actuate the present status file developing unit 39. The present status file developing unit 39 fetches the operation status file of the requested image processing apparatus from the file server 2, and converts the file into a bit map and transfers it to the display device 35. This allows the display device 35 to display an operation status file such as shown in FIG. 16 on the screen thereof.

In FIG. 16, the status of failures or consumable supplies is listed together with the date and time. This enables the supervisor or customer engineer to clearly recognize the history of the operation status of the image processing apparatus 3, and to utilize it for the maintenance thereof.

In the same manner as the function list file and process list file, the operation status file includes, as additional information, the name of the image processing apparatus, the name of the network, the domain, the location, and the name of the supervisor of the image processing apparatus.

In FIG. 16, "Jam" indicates the jamming of paper in the IOT 15, and "Drum" indicates the malfunction of the photoreceptor of the IOT 15. Although only the type of failure is shown in FIG. 16, it is a matter of course that other information such as the location of failures can also be listed using appropriate codes.

Although the invention has been heretofore described with reference to one embodiment thereof, it will be understood by those skilled in the art that the invention is not limited to the above embodiment and that various modifications can be effected. For example, only a single image processing apparatus 3 is connected to the network 1 in FIG. 1, but a plurality of image processing apparatuses may also be connected thereto.

Furthermore, although the above embodiment includes the file server 2 as storage means for storing various files, the provision of such a separate storage unit is not necessarily required. For example, the auxiliary storage unit provided in the terminal unit 4 can be used as the storage means.

As apparent from the above description, according to the invention, terminal units are not required to directly communicate with the image processing apparatus, but required only to access the storage means so as to obtain necessary information about the image processing apparatus. Accordingly, the communication protocol can be greatly simplified as compared with that of a conventional system.

Even when an image processing apparatus having a printing protocol different from those of the existing apparatuses is to be newly installed, it is not necessary to install this printing protocol on the terminal units. The printing protocol is required to be installed only on the storage means, thereby greatly reducing the necessity of troublesome work.

Furthermore, the user can always obtain the latest information on the function, processing status, or operation status of the image processing apparatus, thereby attaining improved productivity.

What is claimed is:

1. An image processing system comprising:

a network;

storage means connected to said network;

an image processing apparatus connected to said network; and at least one image data transmitting unit connected to said network to transmit image data and being separate from said storage means, wherein said at least one image data transmitting unit comprises:

operation mode specifying means for specifying an operation mode of said image processing apparatus;

operation mode file creation means for creating an operation mode file on the basis of the operation mode specified by said operation mode specifying means; and operation mode file registration means for registering the operation mode file created by said operation file creation means, in said storage means, and said image processing apparatus comprises:

image data input means for receiving image data transmitted from said image data transmitting unit; and operation mode set means for setting an operation mode for processing the image data received by said image data input means, in accordance with the operation mode file registered in said storage means.

2. The image processing system according to claim 1, wherein said operation mode file registration means adds a device identifier for identifying the image data transmitting unit, to the operation mode file created by said operation mode file creation means, and registers the operation mode file with the device identifier in said storage means.

3. The image processing system according to claim 1, wherein said operation mode file registration means adds a user identifier for identifying a user of the image data transmitting unit, to the operation mode file created by said operation mode file creation means, and registers the operation mode file with the user identifier in said storage means.

4. An image processing system comprising:

a network;

storage means connected to said network;

an image processing apparatus connected to said network; and at least one image data transmitting unit connected to said network to transmit image data and being separate from said storage means, wherein said image data transmitting unit comprises:

detection means for detecting a status of said image processing apparatus;

status file creation means for creating a status file indicating the status of said image processing apparatus, on the basis of information obtained through detection by said detection means; and status file registration means for registering the status file created by said status file creation means, in said storage means, and said image data transmitting unit comprises:

display means; and status file displaying means for allowing the status file registered in said storage means by said status file registration means to be displayed on said display means.

5. The image processing system according to claim 4, wherein said detection means detects at least functions available in said image processing apparatus, and the status file created by said status file creation means includes data representing a list of the available functions of said image processing apparatus detected by said detection means.

6. The image processing system according to claim 5, wherein said image data transmitting unit further comprises:

function list creation means for identifying functions provided by said image processing apparatus, on the basis of the status file; and function specifying means for causing available functions to be displayed in a different manner, on the basis of the functions of said image processing apparatus identified by said function list creation means.

7. The image processing system according to claim 4, wherein said detection means detects at least a status of the operation of the image processing, apparatus and the status file created by said status file creation means includes data representing a list of the operation status of said image processing apparatus detected by said detection means.

8. The image processing system according to claim 4, wherein said detection means detects at least a status of failures and/or consumable supplies in the image processing, apparatus and the status file created by said status file creation means includes data representing a list of the status of failures and/or consumable supplies in said image processing apparatus detected by said detection means.

* * * * *

UNITED STATES PATENT AND TRADEMARK OFFICE
CERTIFICATE OF CORRECTION

PATENT NO. : 5,493,408
DATED : February 20, 1996
INVENTOR(S) : Toshio KUROGANE et al It is certified that error appears in the above-indentified patent and that said Letters Patent is hereby corrected as shown below:

Claim 7, Column 14, Line 67, ", apparatus" should read --apparatus,--.

Claim 8, Column 15, Line 6, delete "," after "processing".

Claim 8, Column 16, Line 1, after "apparatus" insert --,--.

Signed and Sealed this

Eighteenth Day of March, 1997

Attest:

BRUCE LEHMAN

*Attesting Officer*　　Commissioner of Patents and Trademarks